June 3, 1969     P. F. HAYNER ET AL     3,447,566

LOW NOISE REDUCING VALVE FOR STEAM SYSTEMS

Filed June 28, 1965

INVENTORS

PAUL F. HAYNER
LAWRENCE W. SHARPE

ATTORNEY

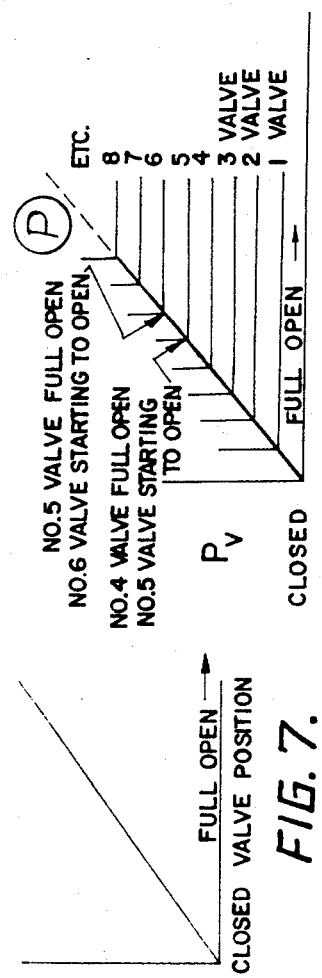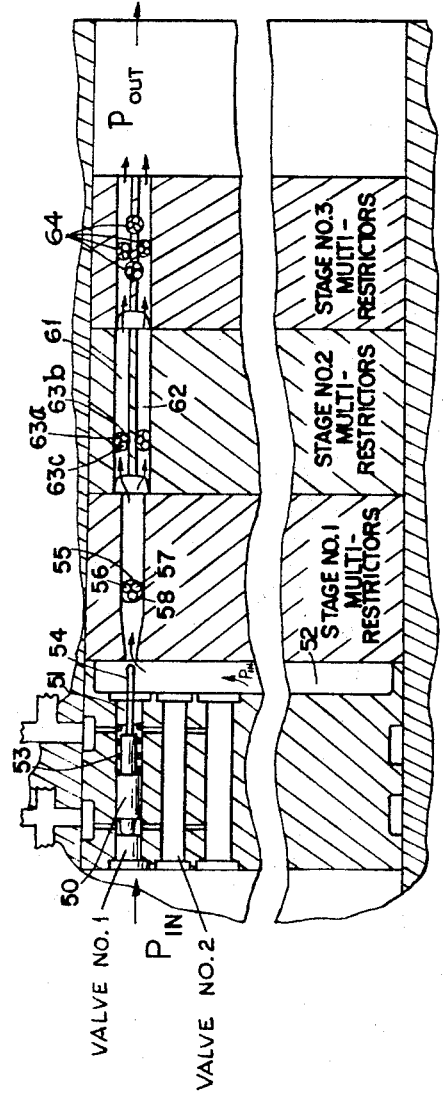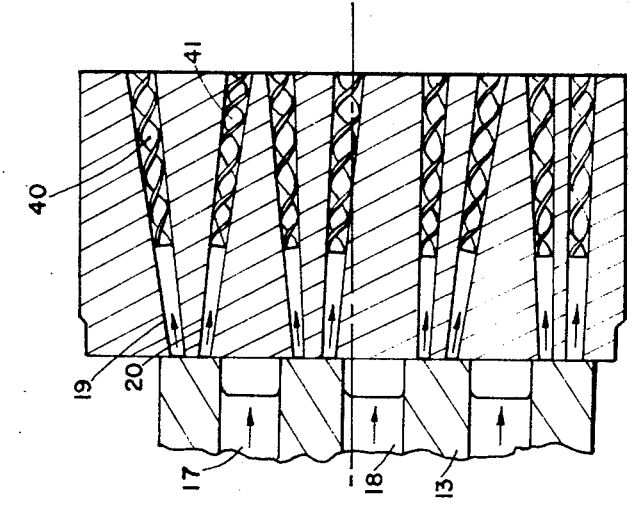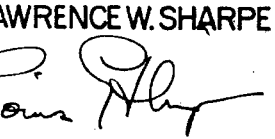

United States Patent Office 3,447,566
Patented June 3, 1969

3,447,566
LOW NOISE REDUCING VALVE FOR STEAM SYSTEMS
Paul F. Hayner, Lexington, Mass., and Lawrence W. Sharpe, Glencliff, N.H., assignors to Sanders Associates, Inc., Nashua, N.H., a corporation of Delaware
Filed June 28, 1965, Ser. No. 467,663
Int. Cl. F16k *31/12, 47/02;* F16l *55/02*
U.S. Cl. 137—489.5                                17 Claims

ABSTRACT OF THE DISCLOSURE

The present invention pertains to a low noise pressure reducing valve, particularly intended for use in steam systems, having a plurality of restrictors which are constructed so as to limit the velocity of fluid passing therethrough to a value which is less than sonic speed.

This invention relates to a low noise reducing valve intended for use with steam systems, especially for use on nuclear submarines, although it may be used in other environments where it is desired to reduce the output pressure of steam by the use of a valve having maximum reliability and life expectancy, a substantial reduction of noise which would be produced in the absence of this invention, and minimum maintenance requirements, particularly its capacity for on-board overhaul when necessary.

Because of the design and construction of the embodiment of the invention herein described, on-board overhaul should be necessary only after a period of about three years.

Among the objects of our invention are the following:

To provide an overall reduction of noise heretofore generated by the reducing valves employed, of about 40 db, while meeting performance requirements under service test conditions;

To provide such a valve having maximum reliability and life expectancy;

To provide a minimum maintenance design, capable of on-board overhaul after not substantially less than three years of service;

To provide a design which may readily be scaled to meet current or future pressure and flow requirements;

To provide a design capable of low-cost, volume production;

To provide such a valve in which the cost and time of production is reduced to a minimum by utilizing the body castings, end caps, and first stage assemblies from the 2½" reducing valves now in service, and in which the present valves and valves according to this invention are physically interchangeable, allowing relatively quick and easy replacement of the present valves by valves according to this invention. Still other objects and advantages of this invention will be apparent from the specification.

Figure 1:
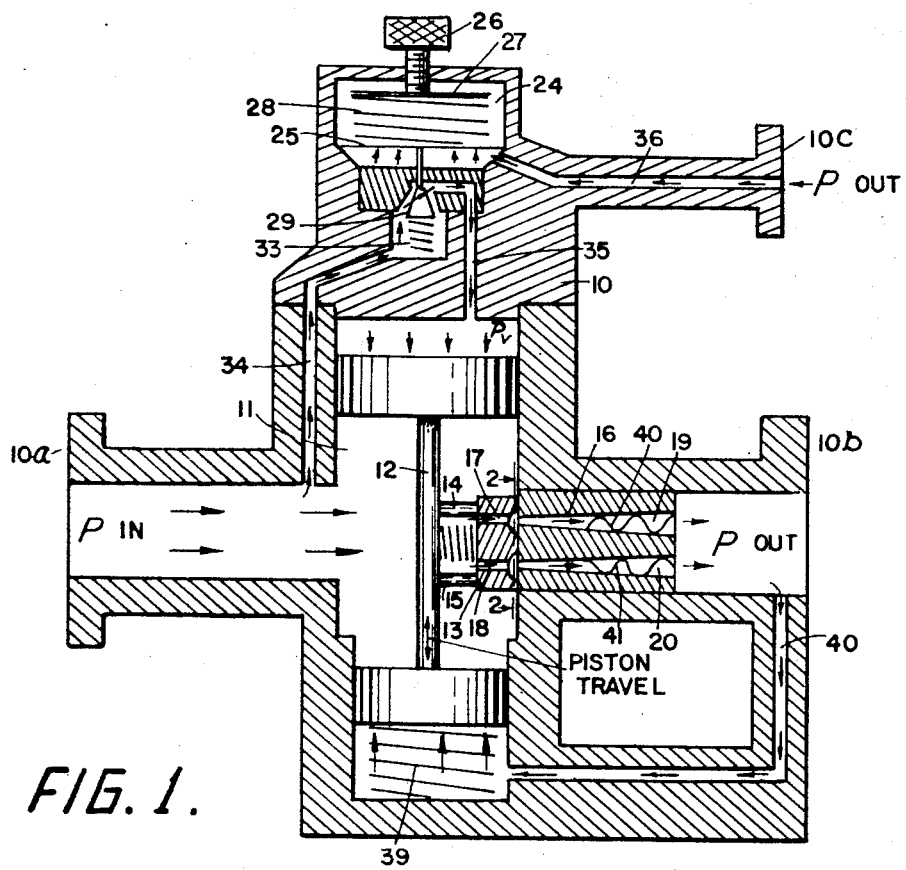
Figure 2:
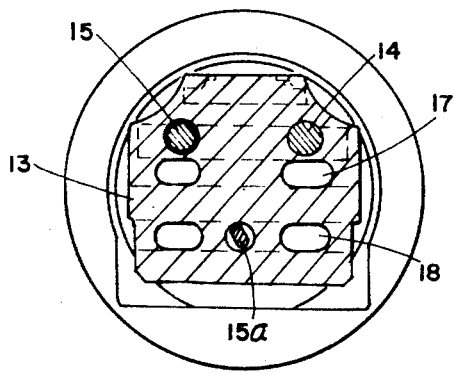
Figure 3:
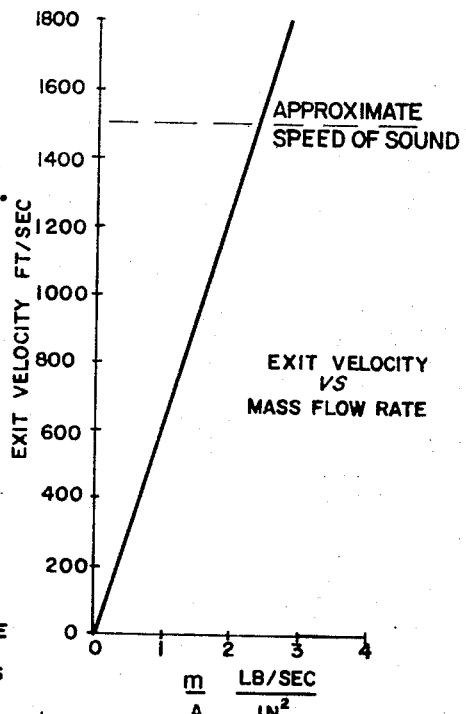
Figure 4:
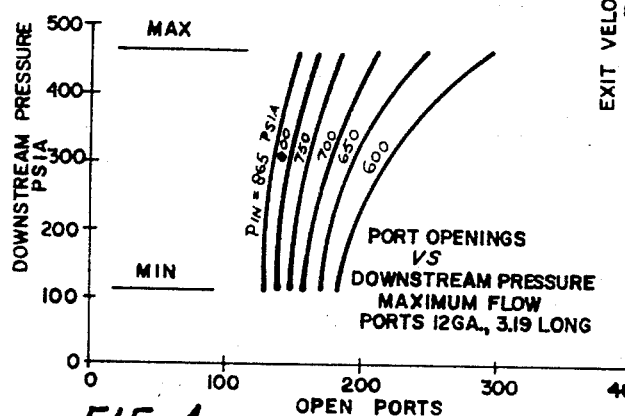
Figure 5:
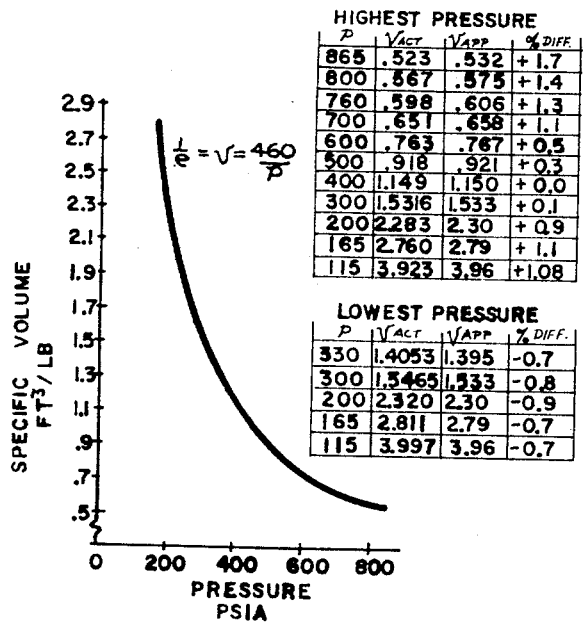

The features of novelty which are believed to be characteristic of this invention are set forth with particularity in the appended claims. Our invention, itself, however, both as to its fundamental principles and as to its particular embodiments, will best be understood by reference to the specification and accompanying drawings, in which FIG. 1 is a sectional schematic view of a reducing valve according to this invention, FIG. 2 is a sectional view on lines 2—2 of FIG. 1, FIG. 3 is a plot of exit velocity in feet/sec. (ordinates) vs. mass flow rate, $M/A = \text{lb.}/\text{sec.}/\text{in.}^2$, FIG. 4 is a plot of the number of port openings (abscissae) vs. downstream pressure in p.s.i.a., pounds per square inch absolute, (ordinates) for maximum flow, FIG. 5 is a plot of specific volume (ordinates) vs. pressure in p.s.i.a. (abscissae) for constant enthalpy expansion, FIG. 6 is a diagrammatic sectional view of the restrictor retainer carrying a multiplicity of restrictors, and a portion of the slide valve which opens and closes said restrictors, FIG. 7 is a plot of $P_V$ (ordinates) vs. valve position, for large control valves, from fully closed to fully open, FIG. 8 is a plot similar to FIG. 9, but showing the position of individual valves, and FIG. 9 is a detail sectional view showing one of the multiple valves and a plurality of three-stage restrictors which we may employ.

Referring now more particularly to FIG. 1, the reducing valve according to our invention comprises a body 10 to be inserted in the steam line between generator and load, neither of which is shown, since they are, per se, not part of this invention. The body 10 is preferably provided with a flange 10a to be bolted to a corresponding flange on the generator line to permit the flow of steam into the valve, and with a similar flange 10b to be bolted to the load line, to permit the flow of steam at reduced pressure to the load. A third flange 10c may also be bolted to the load line, and the portion of the valve carrying flange 10c has a conduit which will be described in more detail infra.

Within a chamber in the valve body, we provide a piston 12 arranged for longitudinal movement as indicated by the arrows. Secured to and carried by piston 12 there is a slide valve 13 mounted on pins 14, 15 and 15a. As illustrated in FIG. 2, pin 14 is a rotating connection for eccentric adjustment, pin 15 provides holddown adjustment, and pin 15a provides rotational adjustment. Piston 12 is thus made to bear against restrictor retainer 16, permitting the passage of steam from chamber 11, through a number of ports 17 and 18 into restrictors 19 and 20. In FIG. 1 only two such restrictors are shown for simplicity, but it will be understood that the number of restrictors may be greatly increased in accordance with the principles which will be explained hereinafter. At this time it is necessary only to point out that the restrictors are so constructed as to limit the velocity of fluid passing through them to less than sonic speed.

On the top side of piston 12, in the embodiment of the invention shown, we provide a regulator pressure setting adjustment, comprising a smaller chamber 24, closed at the piston side (bottom, as shown) by a diaphragm 25, pressed toward piston 12 by pressure adjusting screw 26 and carrying plate 27 bearing against the upper end of spring 28, the lower end of which seats on the upper side of diaphragm 25. It will be understood that by rotation of screw 26, the spring pressure against diaphragm 25 may be increased or decreased, and this controls the pressure drop through the valve, as will be explained later.

Below diaphragm 25 we provide a pilot valve 29, the stem of which is secured to the diaphragm 25. The pilot valve 29 is spring biased to a closed position by relatively weak spring 33, which controls the flow of steam at input pressure, through conduit 34, through pilot valve 29, and through conduit 35 to chamber 11 above piston 12.

Steam at output pressure is supplied through conduit 36 to the space below diaphragm 25. It will now be readily seen that as the output pressure rises too high, acting against the lower side of diaphragm 25, it moves pilot valve 29 towards a closed position, thereby reducing the flow of steam around pilot valve 29 to the top of piston 12, and conversely, if it drops too low, spring 28 moves diaphragm 25 downward, thereby moving pilot valve 29 downward and increasing the flow of steam to the upper side of piston 12, and keeping the output pressure at the desired value, controlled by adjustment screw 26, providing the generator has sufficient capacity to supply all the steam required. Downward movement of piston 12 is opposed by the main spring 39 and the output steam pressure admitted through conduit 40 below piston 12.

This operation, above described, should not be confused with the throttle operation, which again requires that the generator be capable of supplying all the steam needed at full throttle, and still be capable of holding the output pressure at the desired value.

It should be further understood that variations in the amount of steam withdrawn from the generator with an unchanged throttle position are relatively minor, whereas the variations in such withdrawal as the throttle or throttles are changed, say from "stop" to "full speed" are major variations. The construction and operation of the valve to achieve this result, with greatly reduced noise and substantially no acoustic vibration or shock waves produced in the valve, will now be described. In this explanation, reference will be made to FIGS. 1–8, inclusive.

The basic principle of operation of the valve according to our invention is the use of a number of small individual valves in parallel which are caused to open sequentially as the demand for steam flow increases, while maintaining the downstream (output) pressure.

Each of these valves will open a series of restrictors as shown in FIG. 1, the restrictors being designed and constructed to limit the fluid velocities to less than sonic (speed of sound) at any point in the flow path even under maximum differential pressure conditions. The number of these individual valves and restrictors will be determined by the maximum fluid flow required under minimum pressure differential conditions. As an example, we have found that a single restrictor approximately 2.82″ long, formed by three tubes brazed into a hole 0.152″ in diameter, will have less than sonic flow under maximum differential pressure conditions (i.e., 750 p.s.i.). It will take about 200 such restrictors in a single stage to provide 17,000 lb. of steam per hour, under lowest differential pressure. Further investigation shows that an individual two-stage restrictor (two single stage restrictors in series) approximately 1.5″ long, as shown in FIG. 6, will have less than sonic flow under maximum differential pressure conditions (i.e. 750 p.s.i.). Each restrictor will provide approximately 35 lb. of steam per hour.

The valve mechanism shown herein utilizes a pilot valve 29 which is spring restrained and caused to move by a force proportional to the output pressure (similar to the present pressure regulating valves now in service). The output of this pilot valve is a rate of change of pressure $dP_v/dt$ proportional to the displacement of the pilot valve from its closed position, i.e., proportional to the output regulated pressure error.

The output pressure of the pilot stage $P_v$ is fed back to the multiple valve and restrictor assembly. Each valve is spring set to open at a different pressure $P_v$ such that the total number of valves open is proportional to the pressure $P_v$. Actually, each valve operates similarly to the one large valve of the common pressure regulator now in general use, the major difference being that each multiple valve operates sequentially and in parallel over a narrow and different pressure of the overall pressure range of $P_v$. As a result, the integrated opening of all valves for any set point is linear with respect to $P_v$. The restrictors are preferably made of stainless steel tubing or the equivalent.

For a better understanding of this invention, consideration should be given to present steam pressure valve regulating valve characteristics. In such valves, the steam velocity at the smallest flow area (throat) will be sonic. As the downstream pressure is reduced below the upstream pressure, the flow tends to increase until the downstream pressure is about 57% of the upstream. At this point, the velocity at the throat is sonic. Any further reduction in downstream pressure does not yield any more flow. This condition is called "sonic choke." The only way to increase the flow is to enlarge the throat area (i.e., open the valve more). At this point it appears that the valve is transmitting standing waves. It is then extremely noisy.

In a smooth converging-diverging nozzle, three events can occur after the sonic throat velocity is reached:

(1) The fluid will decelerate to a low velocity due to the diverging effect of the nozzle and a pressure slightly below $P_{in}$, or (2) The fluid will accelerate to a supersonic velocity at a pressure much lower than $P_{in}$, or (3) The fluid will form a shock wave to a third intermediate pressure.

The "sonic choke" condition can also occur in long tubes where the frictional pressure drop causes the density to lower, therefore requiring higher velocities. These higher velocities in turn cause higher pressure drops in turn, until sonic velocity is reached.

In the present invention, we use the frictional pressure drop in long, thin tubes to reduce the steam pressure. These tubes are not long enough to cause sonic velocity to occur. As one example, using a single restrictor stage of straight tubes having an $L/D$ (length to diameter) ratio of not more than 100, under normal operation the steam flow would be less than 600 ft./sec., and at the worst condition (maximum inlet pressure, minimum outlet pressure), the speed would be about 1000 ft./sec. These velocities are below the speed of sound. Throttling for the various speeds is accomplished by opening and closing ports as required, thereby supplying more steam for faster speeds.

It can be demonstrated mathematically that to prevent the velocity from approaching sonic, $m/A$ should be kept below 1.75, where $m$=the flow of steam in pounds per second across a fixed cross-sectional area, and $A$=the cross-sectional area in square inches.

In order to pass 17,000 lb./hr. (maximum flow) at $m/A=1.75$, the total area required is 2.7 sq. inches, and N (the number of tubes, having an inner diameter of 0.05 inch, required) is $$\frac{2.7}{\frac{\pi}{4}(.05)^2} = 1380 \text{ tubes}$$

Manufacturing a restrictor block with its restrictors to these specifications to fit in the space available would be impractical and expensive, if it could be done at all. However, we may use a design like the laminar restrictors disclosed in United States patent application Ser. No. 352,246, filed Mar. 16, 1964, and assigned to the assignee of the present patent application. In this design, a bundle of small tubes are held in a larger tube. This design incorporates the features of small hydraulic diameter and large flow area.

A bundle of three 15GA hypodermic needles, .072″ OD, .054″ ID, would give a net area of 0.1287 sq. in., therefore requiring 210 ports. The hydraulic diameter is .0309″, thus requiring a length of 2.82″. A bundle of three 12GA needles, .109″ OD and .085″ ID, yields a net area of .0210″ for only 130 ports. The hydraulic diameter is .0328″, necessitating a length of 3.19″. Using this latter design, the pressure drop equation reduces to $$P_{in}^2 - P_{out}^2 = 240,000 \left(\frac{m}{A}\right)^2$$

Therefore, for any prescribed pressure differential required, there is a set $(m/A)$ value. At a given flow requirement $(m)$ the area, and consequently, the number of open ports are required. This is illustrated in FIG. 4. For lower flow rates the number of ports is reduced proportionally. When using multiple stages, it can be shown that the maximum velocity in the first stage is 580 ft./sec., where that in the second stage is less than 100 ft./sec.

Referring now to FIG. 6, it will be noted that the restrictors 19, 20, etc., are tapered from the input side, increasing in diameter toward the output side. This enables any foreign matter to be carried out the output end of the restrictor tubes, instead of remaining there and perhaps building up a stoppage in the tube. It will also be noted that spiral deflector elements 40, 41, etc., consisting of spirally twisted metallic strips tapered to fit into the tubes, are inserted into the large ends of the tapered tubes, but do not extend all the way to the small ends.

Referring to FIG. 9, in which we have shown a multiple valve assembly controlling a number of 3-stage restrictors in parallel, the multiple valve assembly may control the opening of eight 3-stage restrictors operating in parallel. As the demand for steam increases, this valve (numbered 1–8, inclusive), progressively opens more restrictor paths until finally all paths are open.

This is shown in FIG. 8. At lowest input pressure $P_v$, all valves are closed. As $P_v$ increases, No. 1 valve opens, followed in turn by Nos. 2, 3, 4, 5, 6, 7, and 8, at which time the multiple valve is fully open. As the demand for steam is reduced, the converse action occurs, until finally all valves are closed.

Referring now more particularly to FIG. 9, each multiple valve comprises a piston 50, movable in an opening 51 in multiple valve block 52, spring biased to open position by spring 53 and carrying stem 54 which seats in the inlet opening of restrictor 55 containing three tubes 56, 57 and 58. These in turn feed two second-stage restrictors 61 and 62, each restrictor containing three tubes 63a, 63b and 63c, and in turn feeding the third-stage restrictors, containing four restrictors 64, each containing three tubes as before. The downstream end of restrictors 64 opens to the output side of the valve, i.e., to $P_{out}$.

In its flow through the various paths in the valve according to this invention, the enthalpy of the steam is kept essentially constant, by keeping the velocity changes low. FIG. 5 shows the specific volume vs. pressure for constant enthalpy expansion. The relationship $v=460/P$ (or $P=460/v$) gives a very close approximation over the pressure ranges desired. The steam remains very close to saturation, so that droplets of moisture within the system will not be a major problem.

In the foregoing, we have described our invention and the best mode presently known to us for practicing the same. It will be understood, however, that modifications and changes may be made without departing from the spirit and scope of our invention, as will be clear to those skilled in the art.

We claim:

1. A low noise pressure reducing valve for steam systems, comprising in combination, a valve body, a piston movable in a chamber in said body, inlet and outlet ports in said body, and a pilot valve in said body, a conduit from said inlet port to said pilot valve, a conduit from said pilot valve to one side of said piston, a main actuating spring for said piston on the other side of said piston, a multiplicity of restrictors in said body positioned to receive steam from said chamber, and a valve in said chamber arranged for movement in said chamber to vary the number of restrictors receiving steam, said restrictors limiting steam velocity at any point in the steam path to less than the speed of sound.

2. The valve claimed in claim 1, in which said valve body is provided with a conduit from the output pressure side of said valve to a pressure adjustment chamber in said body, said pressure adjustment chamber having a diaphragm closing said chamber on one side, spring pressure means for adjusting the pressure against one side of said diaphragm, and the space below said diaphragm being exposed to output pressure through said conduit from the output pressure side.

3. The valve claimed in claim 1 wherein each said restrictor includes a spirally twisted strip member longitudinally disposed therein.

4. A low noise pressure reducing valve for steam systems, comprising, in combination, a valve body, a piston movable in a chamber in said body, inlet and outlet ports in said body, a spring-biased pilot valve in said body, means for applying inlet pressure to one side of said pilot valve, in a direction to open said pilot valve to permit access of steam to one side of said piston, spring means for opposing movement of said piston under steam pressure, means comprising a multiplicity of restrictors positioned to receive steam from said chamber, and movable means in said chamber to vary the number of restrictors receiving steam, said restrictors limiting steam velocity at any point in the steam path to less than the speed of sound.

5. The valve claimed in claim 4, in which said valve body is provided with a pressure adjustment chamber, means for applying output pressure to said pressure adjustment chamber, resilient means for opposing movement due to such pressure, and means for adjusting pressure opposing such movement.

6. The valve in claim 1, having a conduit from the output side of said valve to the main spring side of said piston.

7. The valve claimed in claim 2, having a conduit from the output side of said valve to the main spring side of said piston.

8. The valve claimed in claim 4 wherein each said restrictor includes a spirally twisted strip member longitudinally disposed therein.

9. The valve claimed in claim 4, having means for applying pressure from the output side of said valve to the spring opposed side of said piston.

10. The valve claimed in claim 5, having means for applying pressure from the output side of said valve to the spring-opposed side of said piston.

11. A low noise pressure reducing valve for steam systems, comprising, in combination, a pressure input line, a pressure output line, a plurality of restrictors in parallel leading from the input to the output within said valve, said restrictors so designed that the ratio $m/A$ is less than 1.75, where $m$ is the flow of steam in pounds per second across a fixed cross-section area, and A is the cross-sectional area in square inches, and means for opening additional restrictors successively as the demand for steam increases.

12. The valve claimed in claim 11 wherein each said restrictor includes a spirally twisted strip member longitudinally disposed therein.

13. A low noise pressure reducing valve for steam systems, comprising, in combination, a pressure input line, a pressure output line, at least one restrictor leading from the input to the output within said valve, said restrictor being so designed that the ratio $m/A$ is less than 1.75, when $m$ is the flow of steam in pounds per second across a fixed cross-sectional area, and A is the cross-sectional area in square inches.

14. The valve claimed in claim 13 in which said restrictors have a diameter increasing from input to output.

15. The valve claimed in claim 13 wherein said restrictor includes a spirally twisted strip member longitudinally disposed therein.

16. The valve claimed in claim 13 arranged to operate with constant enthalpy expansion.

17. The valve claimed in claim 13 arranged to operate with constant enthalpy expansion over a pressure range closely approximating $P=460/v$, where
  P is the pressure of the steam, and
  $v$ is the specific volume of the steam.

References Cited

UNITED STATES PATENTS

| | | | |
|---|---|---|---|
| 1,567,612 | 12/1925 | Pascale | 251—210 XR |
| 1,802,897 | 4/1931 | Holden et al. | 251—210 |
| 3,170,483 | 2/1965 | Milroy | 137—625.3 XR |

FOREIGN PATENTS 278,451  10/1927  Great Britain.

M. CARY NELSON, *Primary Examiner.*

ROBERT J. MILLER, *Assistant Examiner.*

U.S. Cl. X.R.

137—625.23; 251—126